United States Patent [19]

Chapman

[11] Patent Number: 5,024,251
[45] Date of Patent: Jun. 18, 1991

[54] LAY-IN WIREWAY ASSEMBLY

[75] Inventor: Donald L. Chapman, Liberty, Ind.

[73] Assignee: Square D Company, Palatine, Ill.

[21] Appl. No.: 547,425

[22] Filed: Jul. 3, 1990

Related U.S. Application Data

[63] Continuation of Ser. No. 465,582, Jan. 18, 1990, abandoned, which is a continuation of Ser. No. 220,913, Jul. 19, 1988, abandoned, which is a continuation of Ser. No. 096,802, Sep. 10, 1987, abandoned, which is a continuation of Ser. No. 752,864, Jul. 8, 1985, abandoned.

[51] Int. Cl.⁵ ..................... F16L 09/22; H02G 03/04; H02G 03/06
[52] U.S. Cl. ........................... 138/92; 138/155; 138/156; 138/164; 138/167; 16/361; 174/68.3; 174/101
[58] Field of Search ............. 138/92, 155, 162, 163, 138/158, 164, 103, 156, 167; 174/68.3, 68.1, 101; 16/361

[56]  References Cited

U.S. PATENT DOCUMENTS

| | | | |
|---|---|---|---|
| 1,352,379 | 9/1920 | Pounder | 16/361 |
| 2,042,886 | 6/1936 | Ferguson | 16/361 |
| 2,238,530 | 4/1941 | Lickteig | 16/361 |
| 2,777,156 | 1/1957 | Weisgarber | 16/361 |
| 3,570,546 | 3/1971 | Jackson | 138/155 |
| 3,636,984 | 1/1972 | Rauhauser | 138/155 |
| 4,037,626 | 7/1977 | Robert | 138/155 X |
| 4,077,434 | 3/1978 | Sieckert et al. | 138/155 X |
| 4,398,564 | 8/1983 | Young et al. | 138/155 X |

FOREIGN PATENT DOCUMENTS 1342594 1/1971 United Kingdom ................ 174/101

Primary Examiner—James E. Bryant, III
Attorney, Agent, or Firm—Larry I. Golden

[57]  ABSTRACT

A oiltight lay-in wireway comprised of wireway sections with hinged covers and a joint connector between the covers of two adjacent wireway sections. The covers overlay the joint connector. The joint connector has a free floating hinge connecting it to the wireway sections, allowing the cover to provide the main compression force on the joint connector gasket. A bolt with a splined shoulder provides a grounded connection between adjacent wireway sections while still allowing the joint connector to float freely. The compression force on the joint connector is exerted by the covers which are held closed by clips on the wireway sections. An oil resilient gasket provides a seal between adjacent wireway sections, between the joint connector and wireway sections, between the cover and joint connector, and between the cover and wireway sections. Raised ends on the cover contact the joint connectors while still maintaining a seal with the wireway sections.

12 Claims, 4 Drawing Sheets

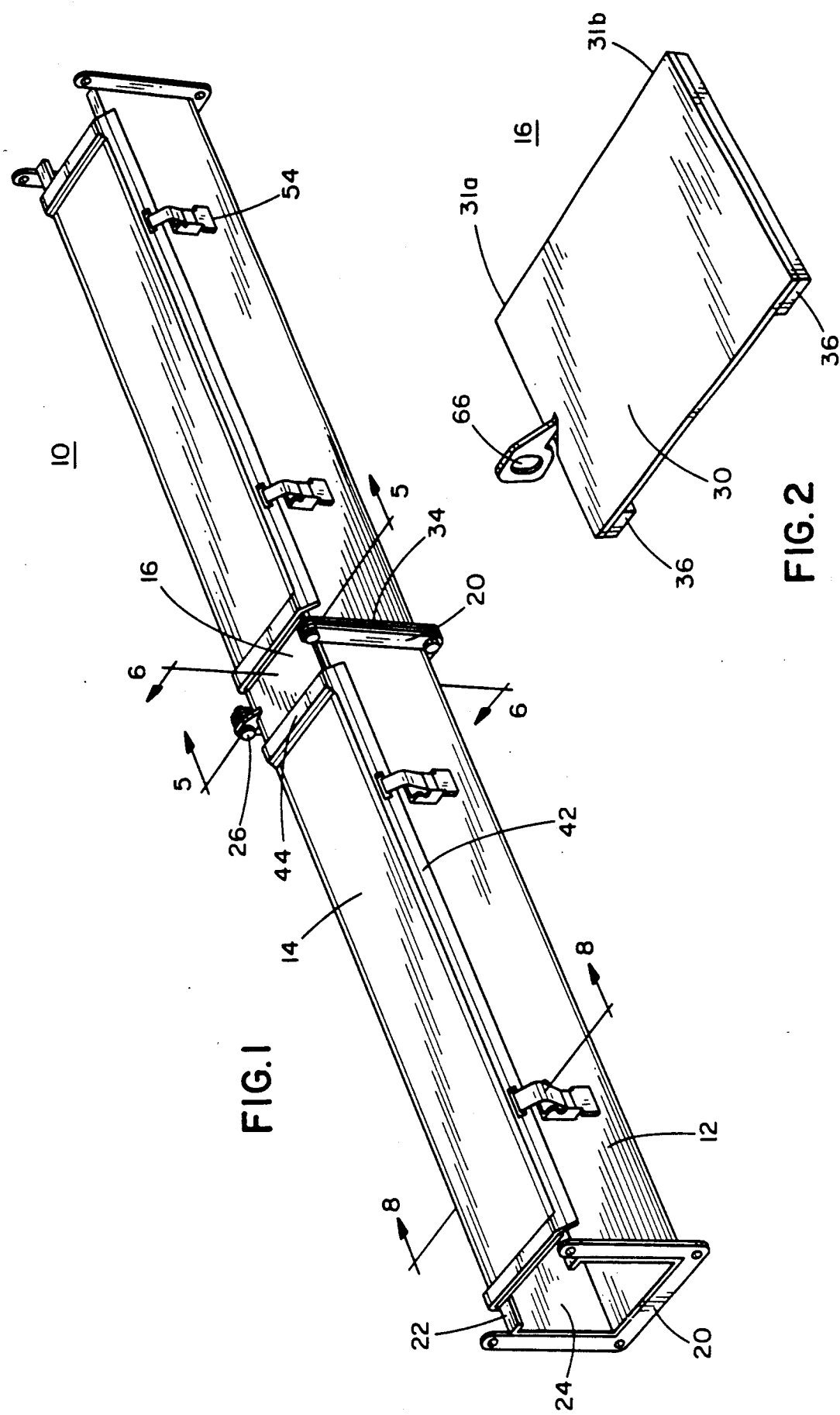

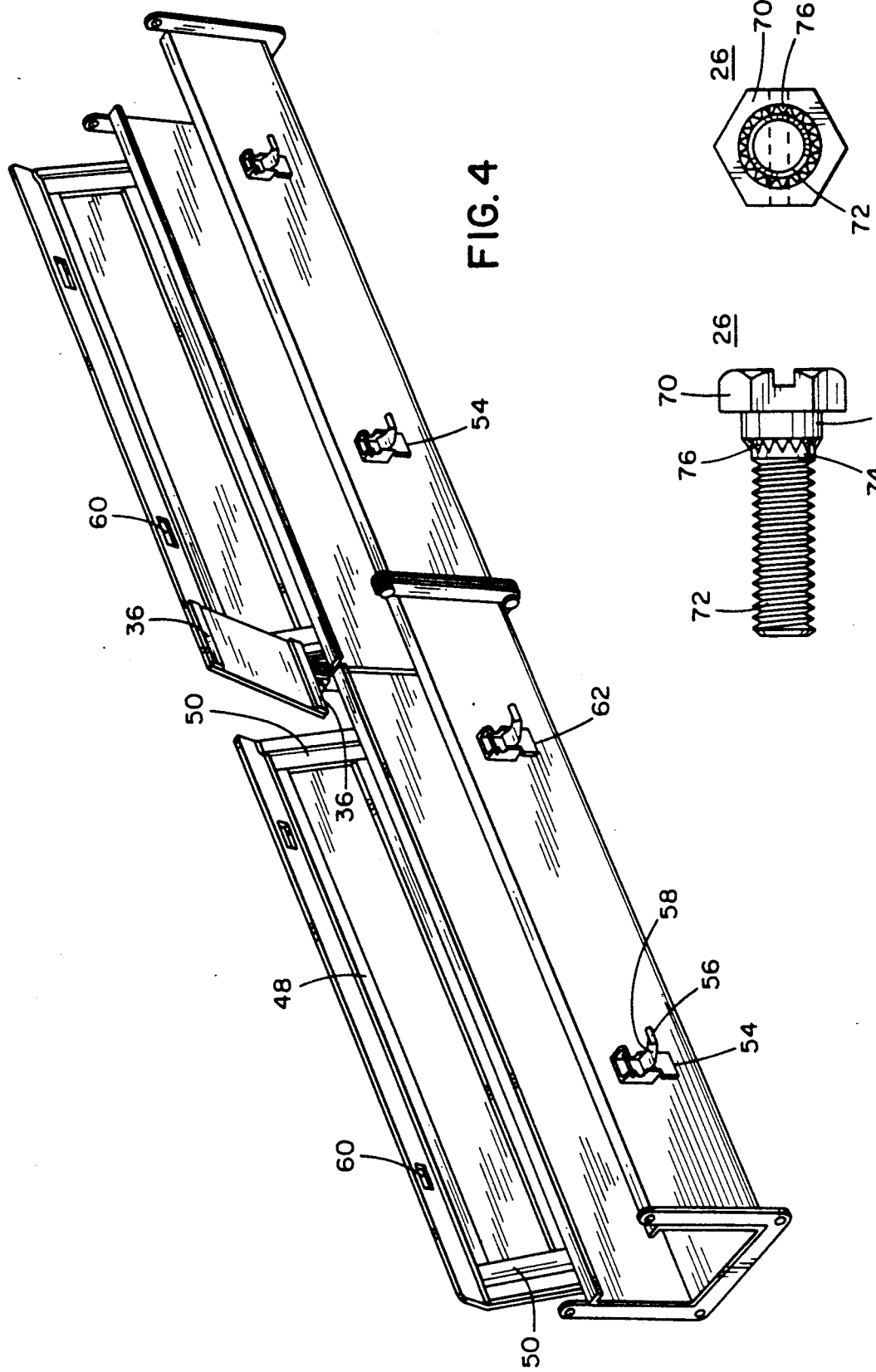

5,024,251

LAY-IN WIREWAY ASSEMBLY

This application is a continuation of Ser. No. 07/465,582, filed Jan. 18, 1990, now abandoned, which is a continuation of Ser. No. 07/220,913, filed July 19, 1988, now abandoned, which is a continuation of application Ser. No. 07/096,802, filed Sept. 10, 1987, now abandoned, which is a continuation of application Ser. No. 06/752,864, filed July 8, 1985, now abandoned.

FIELD OF THE INVENTION

This invention relates to lay-in wireway and is more particularly directed to an oiltight connection between adjacent wireway sections.

DESCRIPTION OF PRIOR ART

Lay-in wireway is used in installations where it is necessary to completely enclose electrical cables to protect them from the elements, but where it is also desirable to allow easy access to the cables. The wireway may be placed in a manufacturing area where the dust, water or oil in the environment would cause the cables to deteriorate. The wireway also prevents oil or other undesirable substances from entering the machines connected by the cables. The wireway must be oiltight to protect the cables and machines in these applications.

Earlier attempts at providing a fluidtight wireway such as that shown in U.S. Pat. No. 3,636,984 issued on Feb. 4. 1971 to Rauhauser for "Hinged Bridging Plates For Lay-In Wireways" were only partially successful. The fluidtightness of the wireway of Patent '984 depends upon the exact position of the pivot point of the bridging plate. An incorrectly positioned pivot point will result in uneven pressure on the gaskets of the bridging plate which may create a faulty seal. Thus patent '984 requires very close manufacturing tolerances that are difficult to obtain.

U.S. Pat. No. 4,398,564, issued to Young et al on Aug. 16, 1983 for a "Sealed Lay-In Wireway" eliminates this problem by making the seal between the joint connector and the wireway section independent of the hinge to which the joint connector is attached. The '564 patent requires that an operator position the joint connector. If the joint connector is not properly positioned, the wireway will not be fluidtight.

SUMMARY OF THE INVENTION

The present invention possesses the advantages of both types of wireways discussed above. The wireway described herein does not depend on the position of the hinge of the joint connector and neither does it require that an operator exactly position the joint connector on the wireway.

The subject invention utilizes wireway sections having an open side with turned in ledges and a hinged cover to close the open side. A joint connector, which underlies the covers, is connected to the wireway sections by a hinge located on the same side of the wireway section as the cover hinges. A bolt passes through an oblong hole in the joint connector to attach the joint connector to the flanges of adjacent wireway sections. This creates a free floating hinge whereby the pressure on the gasket between the joint connector and wireway section does not depend on the position of the hinge even though the joint connector cannot be separated from the wireway sections.

When the joint connector is rotated to a closed position closing the open side of the wireway section, the joint connector hinge ensures that the joint connector gaskets are properly positioned with respect to the wireway sections. Upon closing the hinged covers, the edges of the covers exert a uniform pressure along the length of the joint connector to ensure an oiltight connection. Compare this method with the above-mentioned invention whereby the closing forces on the joint connector result from a force exerted by the hinge on one side of the joint connector and a closing force on the other side exerted by the covers. Depending on the position of the hinge of the joint connector, the joint connector is susceptible to being more tightly sealed at either the free end or at the hinge end. The present invention ensures a uniform pressure across the entire length of the joint connector.

Adjacent wireway sections are joined end to end by bolting together the flanges on each end of the wireway sections. On the underneath side of the joint connector a gasket creates a seal between the joint connector and the wireway sections. Gaskets are positioned on the underneath side of the covers to create a seal between the cover and the joint connector and the cover and the wireway section. The ends of the cover that overlap the joint connector are raised so as to create a continuous seal along the cover, even along the transition between the wireway section and the joint connector.

The joint connector is connected by a special bolt having a splined shoulder. This bolt maintains an electrical ground between the adjacent wireway sections while allowing the joint connector to float freely.

BRIEF DESCRIPTION OF THE DRAWINGS

FIG. 1 is a perspective view of the subject invention with the covers and joint connectors closed.

FIG. 2 is a perspective view of the joint connector.

FIG. 3a is a side view of the bolt used in the instant invention.

FIG. 3b is a front view of the bolt of FIG. 3a.

FIG. 4 is a perspective view of the wireway with the covers and joint connector in the open position.

DETAILED DESCRIPTION OF THE PREFERRED EMBODIMENT

Figure 5:
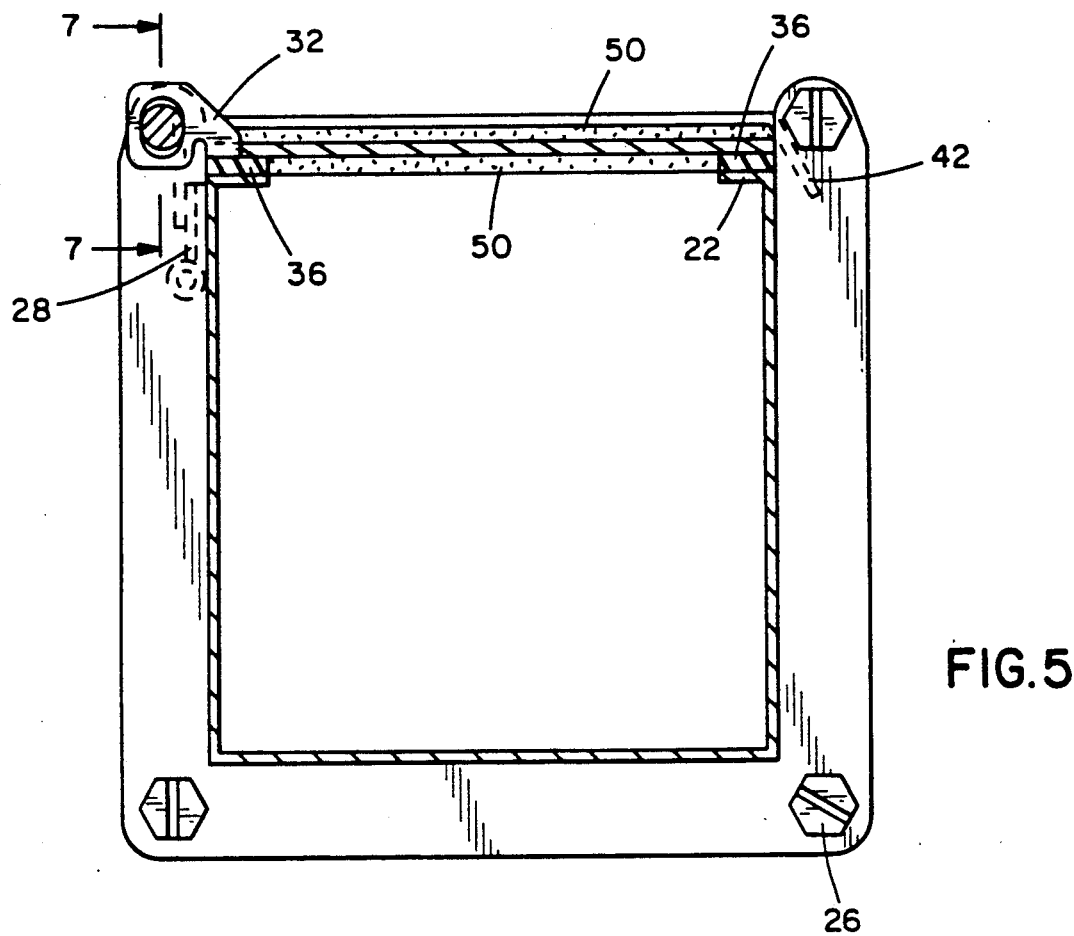
FIG. 5 is a cross-sectional view of the wireway taken along lines 5—5 of FIG. 1.
Figure 6:
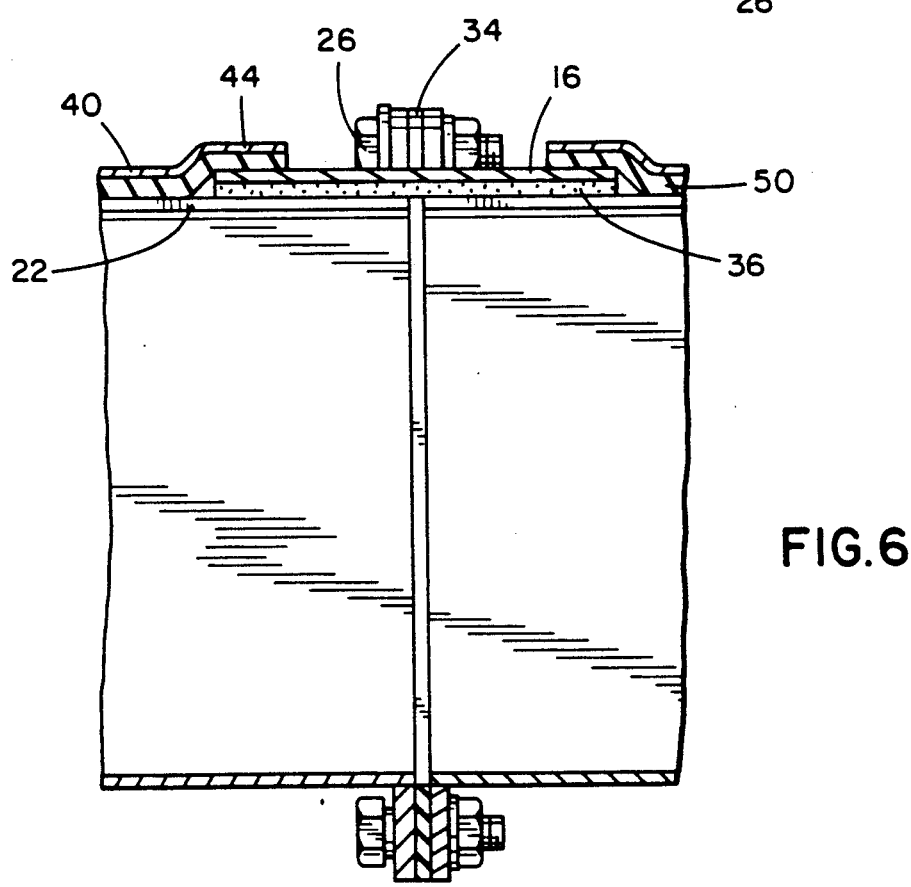
FIG. 6 is a cross-sectional view of the wireway taken along lines 6—6 of FIG. 1.
Figure 7:
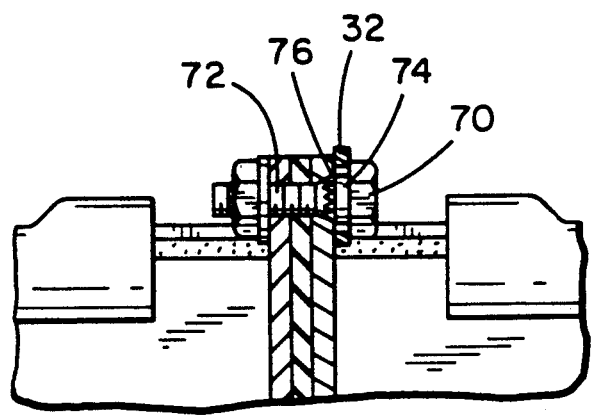
FIG. 7 is a cross-sectional view of the wireway taken along lines 7—7 of FIG. 5.
Figure 8:
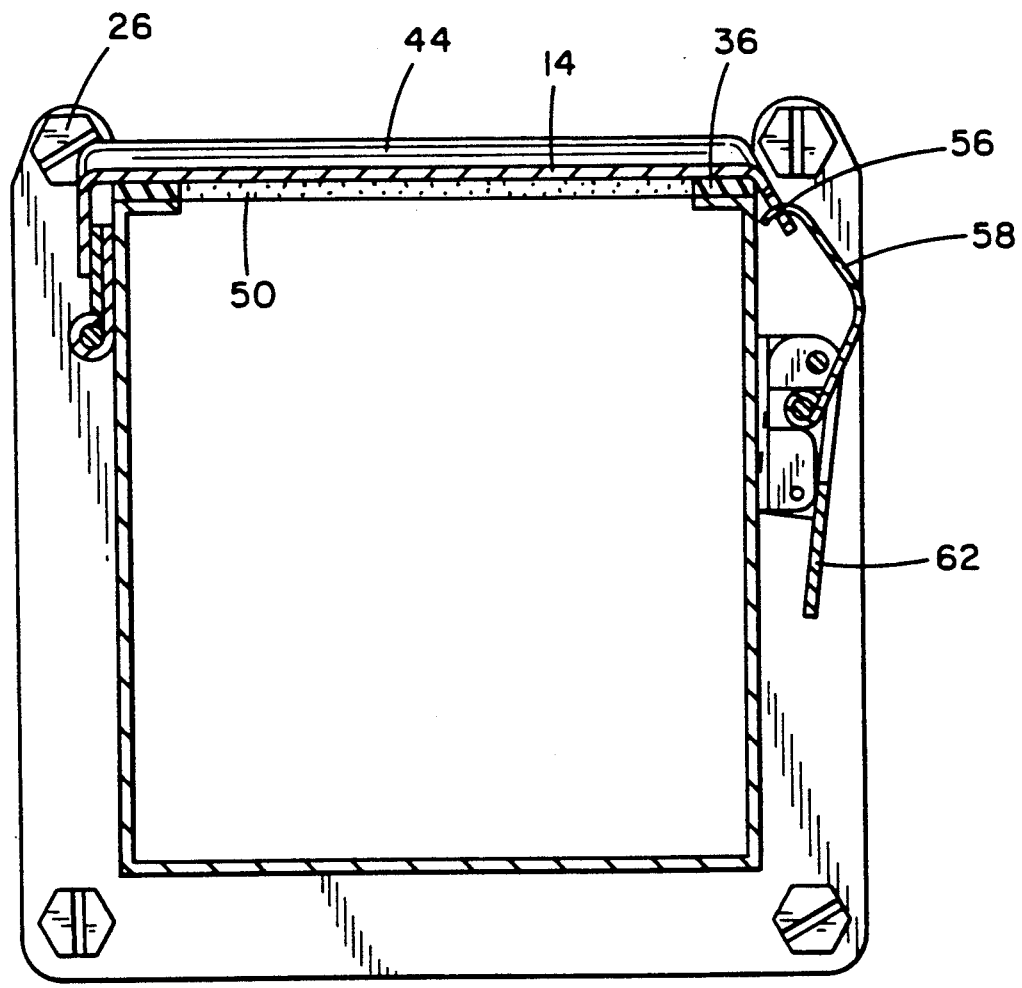
FIG. 8 is a cross-sectional view of the wireway taken along lines 8—8 of FIG. 1.

Referring now to FIG. 1, the wireway assembly, indicated generally as numeral 10, is shown. The wireway assembly includes two wireway sections 12, each having an open side 24. Each wireway section 12 has an end flange 20 and turned in ledges 22 along its open side 24. The flanges 20 of two wireway sections are joined by flange bolts or pivot 26 to connect the wireway sections end to end. Each wireway section has a cover 14 and a joint connector 16 is positioned between the covers 14 of two adjacent wireway sections 12. Each joint connector includes a plate 30 having a tab 32 adjacent the first edge 31a. The second edge 31b of the joint connector lies across the turned in ledges 22 and ends adjacent the end flange 20.

A cover 14 is connected to each wireway section 12 by a hinge 28 (See FIG. 5) welded to the back of the wireway section. The joint connector 16 is connected to adjacent wireway sections 12 by a flange bolt 26 or pivot that passes through the joint connector tab 32. As will be discussed later, the tab 32 and bolt 26 are arranged to allow the joint connector 16 some degree of vertical movement relative to the wireway sections 12, while still maintaining the electrical ground.

The oiltight aspect of the wireway assembly is maintained by resilient gaskets placed between adjoining surfaces. A U-shaped gasket 34 (See FIG. 1) is positioned between two adjacent flanges 20 bolted together. On the underneath side of the joint connector 16 are two gaskets (See FIG. 2) which lie atop the ledges 22 when the joint connector is closed.

The cover 14 consists of a flat portion 40 with downturned edges 42 along both sides and raised ends 44 that accommodate the height of the joint, connectors 16. On the underneath side of the cover 14 gasket 48 is positioned along the sides of the flat portion 40. This gasket 48 is compressed against the ledges 22 of the wireway section when the cover 14 is closed. Gaskets 50 cover the ends of the flat portion 40 and the raised ends 44 on the underneath side of the cover 14. This gasket 50 is compressed against the top and edge of the joint connectors 16 when the cover 14 is closed.

After the joint connector 16 and covers 14 are closed, the pressure is applied to their respective gaskets 36, 48 and 50 by closing clips 54 positioned on that side of the wireway section 12 opposite the hinge 28. The lip 56 of the clip finger 58 is placed in a hole 60 on the cover downturned edge 42. The clip extension 62 is then lowered to cause the finger 58 to exert a downward force on the cover 14 and also on the joint connector 16, compressing their associated gaskets to provide an oiltight assembly. The clip finger 58 is curved to accommodate manufacturing tolerances and to provide resilient pressure on the cover 14 and joint connector 16.

The use of a hole 60 to receive the clip 54 reduces the collection of dirt on the wireway, which is a problem in some installations such as in the food industry. Other wireway designs use an upturned edge on the cover to receive the clip. These designs collect dirt in the upturned edge. When the present design is hosed, all dirt will be washed off.

The pressure on the joint connector 16 is provided solely by the raised end 44 of the cover 14. The joint connector tab 32 has an oblong bore 66 so that when the joint connector 16 is closed and the covers 14 are open, the joint connector 16 has some freedom of movement in the vertical direction. By using the covers 14 to provide the pressure on the joint connector 16, a uniform pressure along the joint connector gaskets 36 is provided as opposed to the uneven pressure which may result from a fixed pivotable joint connector such as that shown in Patent '984.

The bolt 26 includes a head 70, an intermediate portion 78, a threaded portion 72 of a smaller diameter than the intermediate portion 78, and a shoulder 74 which makes the transition from the intermediate portion diameter to the threaded portion diameter. The shoulder 74 includes a spline 76 which cuts through the paint or other finish surrounding the flange hole to provide a electrical ground between adjacent wireway sections 12. The joint connector bore 66 still is free to move about the intermediate portion 78 of the bolt.

While the invention has particularly been shown and described with reference to a preferred embodiment, it will be understood by those skilled in the art that variations and form, construction and arrangement may be made therein without departing from the spirit and scope of the invention. All such variations are intended to be covered in the appended claims.

I claim:

1. A lay-in wireway, comprising:
   a pair of wireway sections connected end to end to form a junction, the wireway sections each having a corresponding open side;
   a joint connector adapted to rest on the open sides of the wireway sections adjacent the junction between the two wireway sections when said joint connector is in a closed position;
   first gasket means, carried underneath said joint connector and positioned between said joint connector and each of said wireway sections, for resiliently sealing between said joint connector and said wireway sections;
   a pair of covers, each one of which is hingedly connected to a respective one of said wireway sections, said covers being movable between an open position wherein said open sides of said wireway sections are uncovered and a closed position wherein said covers overlie said joint connector and cover said open sides of said wireway sections;
   second gasket means, positioned between each of said covers and said joint connector where said covers overlie said joint connector, for resiliently sealing between said covers and said joint connector;
   latch means, operably associated with each of said covers, for latching said covers in their said closed positions and for compressing said first and second gasket means on opposite sides of said joint connector; and
   a floating pivot means for pivotally connecting said joint connector to at least one of said wireway sections so that said joint connector can pivot relative to said wireway sections between its said closed position and an open position, and for allowing said joint connector to float between said covers and said wireway sections as said covers are moved to their said closed positions so that a substantially uniform sealing pressure is provided between said first gasket means and said wireway sections;
   wherein said floating pivot means includes an elongated slot disposed in said joint connector, and a pivot pin attached to said pair of wireway sections, said elongated slot having a longer dimension oriented generally perpendicular to said open sides of said wireway sections, and said pin being received in said slot so that said pin defines a pivotal axis generally parallel to a length of said wireway sections and so that said joint connector is slidable along said longer dimension of said slot relative to said pin;
   wherein adjacent ends of said wireway sections at said junction each include an outwardly extending flange; and
   wherein said pivot pin is defined as a pivot pin portion of an elongated fastener extending between said flanges to connect said wireway sections, said pivot pin portion being an enlarged diameter portion of said fastener extending out from one of said flanges away from the other of said flanges.

2. The lay-in wireway of claim 1, wherein:
said elongated fastener includes a reduced diameter tapered splined portion adjacent said pivot pin portion, said splined portion contacting one of said flanges to provide an electrical ground between said wireway sections.

3. A lay-in wireway, comprising:
a pair of wireway sections connected end to end to form a junction, the wireway sections each having a corresponding open side;
a joint connector adapted to rest on the open sides of the wireway sections adjacent the junction between the two wireway sections when said joint connector is in a closed position;
first gasket means, carried underneath said joint connector and positioned between said joint connector and each of said wireway sections, for resiliently sealing between said joint connector and said wireway sections;
a pair of covers, each one of which is hingedly connected to a respective one of said wireway sections, said covers being movable between an open position wherein said open sides of said wireway sections are uncovered and a closed position wherein said covers overlie said joint connector and cover said open sides of said wireway sections;
second gasket means, positioned between each of said covers and said joint connector where said covers overlie said joint connector, for resiliently sealing between said covers and said joint connector;
latch means, operably associated with each of said covers, for latching said covers in their said closed positions and for compressing said first and second gasket means on opposite sides of said joint connector; and
a floating pivot means for pivotally connecting said joint connector to at least one of said wireway sections so that said joint connector can pivot, about a pivotal axis, relative to said wireway sections between its said closed position and an open position, and for allowing a floating movement of said joint connector between said covers and said wireway sections as said covers are moved to their said closed positions so that a substantially uniform sealing pressure is provided between said first gasket means and said wireway sections, said floating movement being a non-pivotal movement, relative to said pivotal axis, of said joint connector in a direction generally perpendicular to said open sides of said wireway sections when said joint connector is in its said closed position.

4. The lay-in wireway of claim 3, wherein:
said floating pivot means includes an elongated slot disposed in said joint connector, and a pivot pin attached to said pair of wireway sections, said elongated slot having a longer dimension oriented generally perpendicular to said open sides of said wireway sections when said joint connector is in its said closed position thus defining said direction of non-pivotal movement of said joint connector, and said pin being received in said slot so that said pin defines said pivotal axis generally parallel to a length of said wireway sections and so that said joint connector is slidable along said longer dimension of said slot relative to said pin.

5. The lay-in wireway of claim 4, wherein:
said joint connector includes a joint connector plate portion which is adapted to rest on the open sides of the wireway sections, and includes a joint connector tab extending from said joint connector plate portion, said joint connector tab having said elongated slot disposed therein, and said joint connector tab being unrestrained against movement in said direction generally perpendicular to said open sides of said wireway sections except for engagement of said slot with said pivot pin and except for attachment of said joint connector tab to said joint connector plate portion.

6. The lay-in wireway of claim 4, wherein:
said pivot pin is connected between said wireway sections and includes a splined portion in intimate contact with one of said wireway sections to provide an electrical ground between said wireway sections.

7. The lay-in wireway of claim 4, wherein:
said wireway sections each comprise outwardly extending end flanges, said end flanges being jointed to connect said wireway sections; and
said joint connector includes a first edge and a second edge, said elongated slot being disposed in an extension of said joint connector adjacent said first edge, and said second edge not being positioned over said end flanges.

8. The lay-in wireway of claim 3, wherein:
each of said wireway sections includes an inturned ledge along both lengthwise sides of said open side.

9. The lay-in wireway of claim 3, wherein:
said covers include raised ends to accommodate said joint connector where said covers overlie said joint connector.

10. The lay-in wireway of claim 3, further comprising: third gasket means, positioned between said covers and said wireway sections, for resiliently sealing between said covers and said wireway sections.

11. The lay-in wireway of claim 3, wherein:
said covers exert the primary force acting on said joint connector when said covers are latched in their said closed positions.

12. The lay-in wireway of claim 3, wherein:
said joint connector is of a single piece construction.

* * * * *